United States Patent
Ritter et al.

(10) Patent No.: US 11,410,013 B2
(45) Date of Patent: Aug. 9, 2022

(54) METHOD OF FILLING A SLIT IN A METALLIC SMARTCARD

(71) Applicants: John Ritter, West Harrison, IN (US); Jonathan David Payne, Harrison, OH (US)

(72) Inventors: John Ritter, West Harrison, IN (US); Jonathan David Payne, Harrison, OH (US)

(73) Assignee: WHITEWATER SOLUTIONS, LLC, Harrison, OH (US)

(*) Notice: Subject to any disclaimer, the term of this patent is extended or adjusted under 35 U.S.C. 154(b) by 0 days.

(21) Appl. No.: 17/035,643

(22) Filed: Sep. 28, 2020

(65) Prior Publication Data
US 2021/0232887 A1 Jul. 29, 2021

Related U.S. Application Data

(60) Provisional application No. 62/907,304, filed on Sep. 27, 2019.

(51) Int. Cl.
| | |
|---|---|
| *G06K 7/08* | (2006.01) |
| *G06K 19/06* | (2006.01) |
| *G06K 19/077* | (2006.01) |
| *B32B 37/06* | (2006.01) |
| *B32B 27/26* | (2006.01) |

(52) U.S. Cl.
CPC ........ *G06K 19/07722* (2013.01); *B32B 27/26* (2013.01); *B32B 37/06* (2013.01); *G06K 19/07747* (2013.01); *B32B 2310/0831* (2013.01); *B32B 2425/00* (2013.01)

(58) Field of Classification Search
USPC ........................................ 235/380, 451, 492
See application file for complete search history.

(56) References Cited

U.S. PATENT DOCUMENTS

| | | |
|---|---|---|
| 3,838,252 A | 9/1974 | Hynes et al. |
| 6,644,551 B2 | 11/2003 | Clayman et al. |
| 9,390,364 B2 | 7/2016 | Finn et al. |
| 9,489,613 B2 | 11/2016 | Finn et al. |
| 9,622,359 B2 | 4/2017 | Finn et al. |
| 9,634,391 B2 | 4/2017 | Finn et al. |
| 9,812,782 B2 | 11/2017 | Finn et al. |
| 9,836,684 B2 | 12/2017 | Finn et al. |
| 9,960,476 B2 | 5/2018 | Finn et al. |
| 10,193,211 B2 | 1/2019 | Finn et al. |
| 10,248,902 B1 | 4/2019 | Finn et al. |

(Continued)

OTHER PUBLICATIONS

Dymax, Ullia Light-Weld 431-T High-Temperature Moisture-Resistant Glass-to-Metal Bonding Adhesive, Industrial Adhesives 431-T Product Data Sheet, pp. 1-3 (Dec. 27, 2018).

(Continued)

*Primary Examiner* — Tuyen K Vo
(74) *Attorney, Agent, or Firm* — Porter Wright Morris & Arthur LLP

(57) ABSTRACT

A method for filling a through slit in a metal layer for use in a metallic smartcard by providing a metal sheet having at least one through slit extending through the thickness of the metal sheet, applying a polymer resin to the metal sheet so as to substantially fill the slit(s), and curing the resin. A coupling frame for a smartcard, and a smartcard are also provided.

15 Claims, 1 Drawing Sheet

(56) References Cited

U.S. PATENT DOCUMENTS

| | | | |
|---|---|---|---|
| 10,889,053 B1* | 1/2021 | Miller | B29C 64/106 |
| 2003/0112520 A1* | 6/2003 | Takahashi | C09D 175/16 |
| | | | 359/603 |
| 2006/0048467 A1* | 3/2006 | Martineau | E06B 9/52 |
| | | | 52/204.1 |
| 2014/0361086 A1* | 12/2014 | Finn | B23K 26/362 |
| | | | 235/488 |
| 2015/0021403 A1* | 1/2015 | Finn | G06K 19/07794 |
| | | | 235/492 |
| 2015/0180229 A1* | 6/2015 | Herslow | G06K 19/07749 |
| | | | 361/56 |
| 2016/0110639 A1* | 4/2016 | Finn | B23K 26/361 |
| | | | 235/439 |
| 2018/0196980 A1* | 7/2018 | Holmes | B42D 25/29 |
| 2018/0339503 A1* | 11/2018 | Finn | H01Q 1/2225 |
| 2018/0341846 A1 | 11/2018 | Finn et al. | |
| 2018/0341847 A1 | 11/2018 | Finn et al. | |
| 2019/0114526 A1 | 4/2019 | Finn et al. | |
| 2019/0171923 A1 | 6/2019 | Finn et al. | |
| 2019/0197384 A1 | 6/2019 | Pachler | |
| 2019/0197386 A1* | 6/2019 | Finn | H01Q 1/2216 |
| 2020/0136071 A1* | 4/2020 | Somei | H01L 51/445 |
| 2020/0151534 A1* | 5/2020 | Lotya | G06K 19/0723 |

OTHER PUBLICATIONS

Dymax, Multi-Cure 921-T Potting Resin or Adhesive for Plastics and Metals, Electronic Assembly Materials 921-T Product Data Sheet, pp. 1-3 (Dec. 20, 2018).

Dymax, Ultra Light-Weld 3013 Resilient, General Purpose Adhesive, Industrial Adhesives 3013 Product Data Sheet, pp. 1-3 (Dec. 19, 2018).

Dymax, Product Selector Guide, Industrial Adhesives, pp. 1-18 (2018).

* cited by examiner

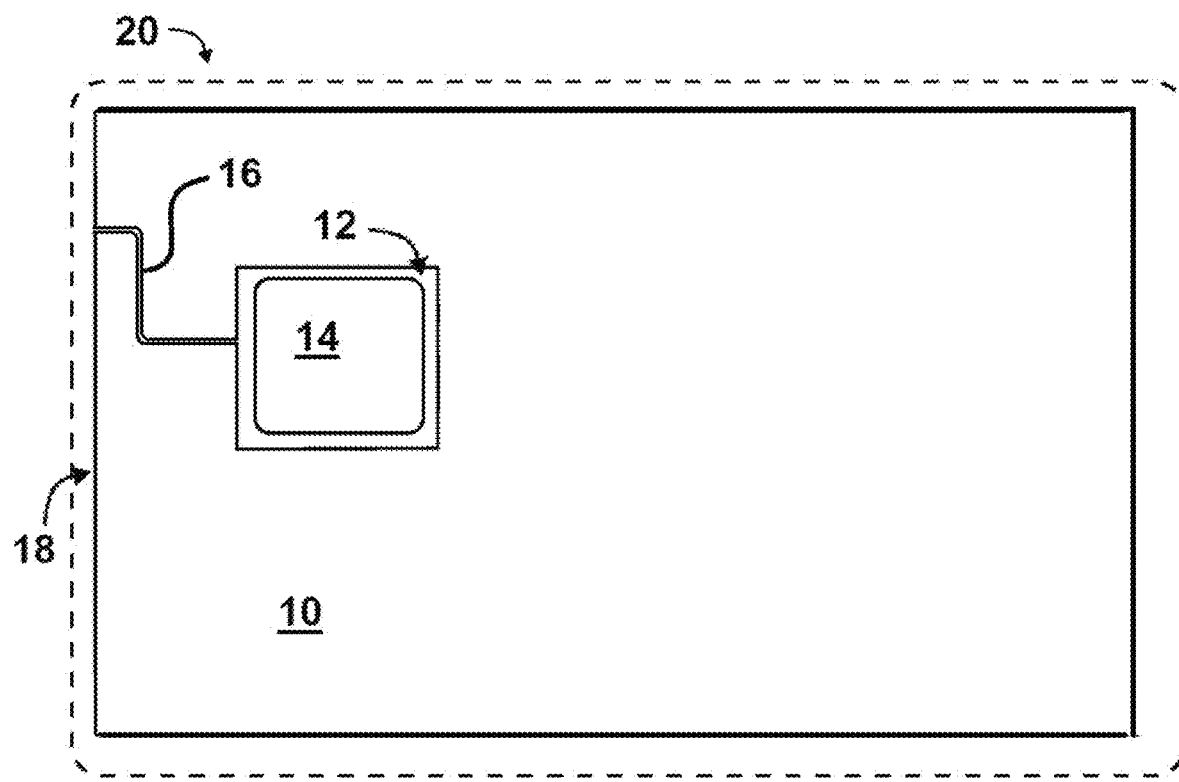

METHOD OF FILLING A SLIT IN A METALLIC SMARTCARD

CROSS-REFERENCE TO RELATED APPLICATIONS

This application claims priority to U.S. Provisional Patent Application No. 62/907,304, filed on Sep. 27, 2019, entitled "METHOD OF FILLING A SLIT IN A METALLIC SMARTCARD." The entire disclosure of the foregoing provisional patent application is incorporated by reference herein.

BACKGROUND

The present disclosure relates to smartcards that can be used for a variety of purposes, such as payment cards, identity cards, credit cards, debit cards, access control cards, mobile payment cards, etc. These smartcards comprise integrated circuits that operate in a contactless mode for transmitting and/or receiving data, such as in accordance with various standards such as ISO 14443 or NFC/ISO 15693. Unlike magnetic stripe cards (e.g., traditional credit cards), contactless smartcards can be read without being inserted into a reader device. Instead, data is transmitted and/or received via radio waves. In many instances, the smartcard itself does not include a power supply. Instead, the electromagnetic signal from the reader device is use to power the smartcard's electronics. ISO 14443 defines a standard for so-called proximity cards that operate at 13.56 MHz, with a range of up to about 50 cm (older designs operated at 125 kHz). NFC/ISO 15693 defines a standard for so-called vicinity cards that operate at 13.56 MHz, with a range of about 1 to about 1.5 meters (about 100 to about 150 cm). Many smartcards also have contact pads for interfacing with an external reader via direct contact (e.g., in accordance with ISO/IEC 7816).

Smartcards are typically provided in a standardized size, particular in accordance with ISO/IEC 7810. Smartcards used for financial purposes (e.g., payment cards, credit cards, debit cards, etc.) meet format ID-1, having dimensions of approximately 86×54×0.76 mm. Other formats include ID-2 (105×74×0.76 mm) and ID-3 (125×88×0.76 mm). Smartcards typically comprise a card body (CB) made of plastic and/or metal, and circuitry such as a transponder chip module comprising an RFID chip and an antenna. As used herein, a "metallic smartcard" refers to a smartcard having at least one metal layer.

Metallic smartcards are often desirable for aesthetics and even the sound resulting when one is dropped onto a hard surface. Because of this, metallic smartcards are often marketed as premium products, with many credit card issuers reserving metallic smartcards for their most expensive offerings and/or high net-worth/spending customers. However, it is often difficult to attach the integrated circuit(s) (the "Chip") required for contactless data transmission to the metal layer. More significantly, the metal layer(s) will typically hinder or prevent contactless communication between the smartcard Chip and the reader.

As described in U.S. Patent Publication Nos. 2015/0021403 and 2019/0197386 (the "Finn Pubs.") and 2019/0197384, all of which are incorporated by reference herein, one solution of to the problem of signal attenuation in metallic smartcards is to provide one or more slits in the metal layer such that the metal layer becomes discontinuous, thereby forming a loop around the Chip. The metal layer thus becomes a coupling frame that at least partially surrounds an opening or recess (the latter of which does not extend through the thickness of the metal layer) in which the Chip is located, such that the coupling frame facilitates contactless communication between the smartcard and the reader. As used herein, the "Chip" is intended to encompass any of the integrated circuits described in the Finn Publications or U.S. Patent Publication No. 2019/0197384.

One issue with the above-described metallic smartcard configurations is that the slit(s) in the metal layer must be filled with an electrically insulating filler material in order to maintain structural strength and rigidity, prevent delamination of the various card layers, and/or seal the smartcard structure. The compositions previously used as a filler, however, have not been successful. In particular, the filler materials tend to separate from the metal layer within the slit if the smartcard is flexed.

While the specification concludes with claims that particularly point out and distinctly claim the invention, it is believed the present invention will be better understood from the following description of certain examples taken in conjunction with the accompanying drawings. In the drawings, like numerals represent like elements throughout the several views.

BRIEF DESCRIPTION OF THE DRAWING

FIG. 1 depicts, in plan view, a slitted metal layer that forms a coupling frame surrounding an opening in which a Chip is located, of a metallic smartcard.

DETAILED DESCRIPTION

The following detailed description describes examples of embodiments of the invention solely for the purpose of enabling one of ordinary skill in the relevant art to make and use the invention. As such, the detailed description and illustration of these embodiments are purely illustrative in nature and are in no way intended to limit the scope of the invention, or its protection, in any manner.

Embodiments of the present disclosure provide a method of filling one or more slits formed in a metal layer of a metallic smartcard, particular one or more slits configured such that the metal layer forms at least one coupling frame that at least partially surrounds an opening or recess in which the Chip is located, such that the coupling frame facilitates contactless communication between the smartcard and a reader. The one or more slits extend through the thickness of at least one metal layer of the smartcard, such as from an opening or recess in which the chip is positioned to an edge of the smartcard. The width of the one or more slits can be constant or vary, and can be about 10 µm to about 500 µm, from about 20 µm to about 250 µm, from about 20 µm to about 100 µm, about 10 µm, about 20 µm, about 30 µm, about 40 µm, about 50 µm, about 60 µm, about 70 µm, about 80 µm, or any of the slit widths described in the Finn Publications.

The method comprises applying an electrically insulating polymer resin to the slitted metal layer for a metallic smartcard so as to substantially fill the slit, and thereafter curing the resin. In some embodiments, the polymer resin comprises an electrically insulating urethane resin, particularly a UV and/or heat-curable urethane resin. In further embodiments, the polymer resin (e.g., a urethane resin) comprises a curable resin having high bond strength to the metallic layer and one or more, two or more, three or more, or all of the following properties (after curing):

| | |
|---|---|
| Durometer Shore D hardness (ASTM D2240) | 60-95 |
| Tensile strength at break (ASTM D2556) | 15-30 MPa |
| Modulus of elasticity (ASTM D638) | 300-600 MPa |
| Elongation at break (ASTM D638) | 40-150% |

In some embodiments, the polymer resin (e.g., a urethane resin) meeting one, two, three or four of the above post-curing properties has a viscosity (prior to curing) of 150-3000 cP at 20 rpm (ASTM D2556).

In one particular embodiment, the metal layer comprises stainless steel, and the resin comprises a UV-curable, acrylated urethane resin (e.g., acrylate-terminated urethane oligomer resin), having an uncured viscosity of 150-3000 cP at 20 rpm (ASTM D2556), a durometer Shore D hardness (ASTM D2240) of 60-95, a tensile strength at break (ASTM D2556) of 15-30 MPa, a modulus of elasticity (ASTM D638) of 300-600 MPa, and an elongation at break (ASTM D638) of 40-150%.

In specific embodiments, the polymer resin used to fill the one or more through slits in the metal layer comprises an acrylated urethane resin such as those available from Dymax Corporation. Suitable resins particularly include acrylate-terminated urethane oligomer resins available from Dymax Corporation as Light-Weld® 431-BF, Light-Weld® 3013, and Multi-Cure® 921-T. Of course other resins meeting the above-described properties can be used, particularly other UV-curable urethane resins.

Applicants have surprisingly found that, unlike the epoxy resins used to fill the through slits in the prior art, cured resins meeting the above-described properties will not delaminate from the smartcards even after repeated flexing of the smartcards.

The resins can be applied and cured in a number of ways. For example, in some embodiments the uncured resin is deposited over the slit(s) so as to substantially cover the slit(s). Thereafter, the uncured resin is forced into the slit by pressure, such as by using a doctor blade (also referred to as a squeegee) or a roller. A doctor blade/squeegee is particularly useful in that it can effectively remove excess resin from the surface of the smartcard (i.e., resin that is not forced into the slit). Once the resin fills or substantially fills the slit(s), the resin is cured using UV light and/or heat. In the case of UV curable resins, the resin material and UV light source can be chosen such that curing is accomplished in less than 20 seconds, less than 10 seconds, or less than 5 seconds.

In order to ensure adequate adherence of the resin within the slit(s), the metal layer can be subjected to a plasma pretreatment in order to remove any organic materials and other contaminants. Plasma pretreatment can be conducted in a vacuum or at atmospheric pressure (i.e., in air). Various other surface cleaning methods can be used instead of or prior to plasma pretreatment, such as cleaning the surface with a suitable solvent (e.g., by wiping the surface with isopropyl alcohol).

FIG. 1 depicts one embodiment of a metal layer (or sheet) (10) of the present disclosure having an opening (or recess) (12) in which a transponder chip module (14) is positioned. A slit (16) extends from the opening (12) to an outer edge (18) of the metal layer (10), and is filled with a cured resin according the methods described herein. The metal layer is part of the metallic smartcard (20), which typically includes one or more additional layers, as explained, for example, in U.S. Patent Publication Nos. 2015/0021403 and 2019/0197386 (the "Finn Pubs.") and 2019/0197384.

The method of the present disclosure is also suitable for filling slits in the metal layers for multiple smartcards at a time. By way of example, a metal sheet (e.g., stainless steel) sized for a plurality of smartcards (e.g., 25 cards) can be processed so as to form slits in a plurality of predetermined locations. Thereafter, the sheet is placed on a support surface and a plurality of computer-controlled nozzles (e.g., five) traverse above the slits (e.g., by moving the nozzles and/or the support surface) in a predetermined pattern so as to deposit the resin over the slits. Next, a squeegee is wiped, under pressure, across the sheet in order to force the resin into the slits and remove excess resin from the surface. The sheet is then advanced beneath a UV light source (e.g., a UV light tunnel) to cure the resin within the slits. Thereafter, metal layers for individual cards can be cut from the sheet such that one of the slits is provided in each of the metal layers, extending to an outer edge of the metal layer, thereby providing slitted metal layers for multiple smartcards (e.g., 25 cards from one sheet).

In an alternative embodiment, the resin is applied above the slits from nozzles such that the resin is drawn into the slits by capillary action. Thereafter, the metal sheet is flipped over and advanced beneath a UV light source. After such UV curing, the sheet if flipped back over and uncured resin is wiped from the surface of the metal sheet not exposed to UV light for curing.

In the embodiments described herein, after the resin within the slits has been cured and uncured resin removed from the metal surface(s), a powder coating can optionally be applied to one or both surface of the metal sheet or layer.

While various embodiments of a method for filling a through slit in a metallic smartcard have been described in detail above, it will be understood that the components, features and configurations, as well as the methods of manufacturing the devices and methods described herein are not limited to the specific embodiments described herein.

What is claimed is:

1. A method for filling a through slit in a metal layer for use in a metallic smartcard, comprising the steps of:
   (a) providing a metal sheet having first and second opposed surfaces and at least one through slit extending through the thickness of the metal sheet;
   (b) applying an electrically insulating, UV-curable polymer resin to the first surface of the metal sheet and over said at least one slit such that the resin substantially fills the at least one slit, with a portion of the resin remaining on the first surface of the metal sheet, outside of said at least one slit;
   (c) exposing the metal sheet to UV light so as to cure said resin within said at least one slit; and
   (d) removing uncured resin from the first surface of the metal sheet.

2. The method of claim 1, wherein said resin comprises a urethane resin.

3. The method of claim 2, wherein said urethane resin comprises a UV-curable resin having high bond strength to the metallic sheet and at least one of the following post-cure properties: Durometer Shore D hardness (ASTM D2240) of 60-95; Tensile strength at break (ASTM D2556) of 15-30 MPa; Modulus of elasticity (ASTM D638) of 300-600 MPa; and Elongation at break (ASTM D638) of 40-150%.

4. The method of claim 3, wherein said urethane resin comprises a UV-curable resin having at least two of said post-cure properties.

5. The method of claim 4, wherein said urethane resin comprises a UV-curable resin having all of said post-cure properties.

6. The method of claim 5, wherein the resin has a viscosity prior to curing of 150-3000 cP at 20 rpm (ASTM D2556).

7. The method of claim 1, wherein said metal sheet has a plurality of said through slits located such that, following said curing step, the sheet can be cut so as to provide a plurality of individual metal layers sized for individual smartcards, with each metal layer having one of said through slits.

8. The method of claim 7, wherein the resin is applied to the first surface of the metal sheet and over said slits from nozzles and, once the resin has substantially filled the slits, the resin is cured exposed to UV light by advancing the sheet beneath a UV light.

9. The method of claim 8, wherein the resin has a viscosity prior to curing of 150-3000 cP at 20 rpm (ASTM D2556).

10. The method of claim 9, wherein the metal layer comprises stainless steel and the resin is an acrylated urethane resin.

11. The method of claim 7, wherein in step (b) the metal sheet is placed on a support surface and the resin is applied from nozzles while the nozzles and/or the support surface are moved in a predetermined pattern so as to deposit the resin over said slits.

12. The method of claim 11, further comprising the step of cutting the metal sheet into a plurality of individual metal layers sized for individual smartcards, with each metal layer having one of said through slits.

13. The method of claim 1, wherein the resin has a viscosity prior to curing of 150-3000 cP at 20 rpm (ASTM D2556).

14. The method of claim 13, wherein the resin has all of the following post-cure properties: Durometer Shore D hardness (ASTM D2240) of 60-95; Tensile strength at break (ASTM D2556) of 15-30 MPa; Modulus of elasticity (ASTM D638) of 300-600 MPa; and Elongation at break (ASTM D638) of 40-150%.

15. The method of claim 1, wherein the step of removing uncured resin from the first surface of the metal sheet is performed prior to exposing the metal sheet to UV light.

* * * * *

UNITED STATES PATENT AND TRADEMARK OFFICE
CERTIFICATE OF CORRECTION

| | |
|---|---|
| PATENT NO. | : 11,410,013 B2 |
| APPLICATION NO. | : 17/035643 |
| DATED | : August 9, 2022 |
| INVENTOR(S) | : John Ritter et al. |

It is certified that error appears in the above-identified patent and that said Letters Patent is hereby corrected as shown below:

In the Claims

Claim 8, Column 5, Line 13, delete "cured".

Signed and Sealed this
Twentieth Day of September, 2022

*Katherine Kelly Vidal*

Katherine Kelly Vidal
*Director of the United States Patent and Trademark Office*